(12) United States Patent
Chen

(10) Patent No.: US 6,673,390 B2
(45) Date of Patent: Jan. 6, 2004

(54) METHOD FOR MANUFACTURING TOUCH SCREEN LINEARIZATION PATTERN

(75) Inventor: Chi-Ruey Chen, Chung-Ho (TW)

(73) Assignee: Eturbotouch Technology Inc., Chung-Ho (TW)

( * ) Notice: Subject to any disclaimer, the term of this patent is extended or adjusted under 35 U.S.C. 154(b) by 258 days.

(21) Appl. No.: 09/814,843

(22) Filed: Mar. 23, 2001

(65) Prior Publication Data

US 2002/0135569 A1 Sep. 26, 2002

(51) Int. Cl.[7] .................................................. B05D 5/12
(52) U.S. Cl. .................... 427/101; 427/125; 427/126.2; 427/201; 427/284; 427/287; 427/269
(58) Field of Search ........................... 178/18.01, 19.01, 178/20.01; 427/58, 282, 201, 125, 101, 284, 287, 269, 126.2; 345/156, 173

(56) References Cited

U.S. PATENT DOCUMENTS

| | | | | |
|---|---|---|---|---|
| 4,293,734 A | * | 10/1981 | Pepper, Jr. | 178/18.01 |
| 4,371,746 A | * | 2/1983 | Pepper, Jr. | 178/18.05 |
| 4,625,075 A | * | 11/1986 | Jaeger | 178/18.03 |
| 5,736,688 A | * | 4/1998 | Barrett et al. | 178/18.05 |
| 5,818,430 A | * | 10/1998 | Heiser | 345/174 |
| 6,259,490 B1 | * | 7/2001 | Colgan et al. | 349/12 |
| 6,473,074 B1 | * | 10/2002 | Okahashi | 345/174 |
| 6,507,337 B1 | * | 1/2003 | Sato et al. | 345/173 |
| 2001/0013855 A1 | * | 8/2001 | Fricker et al. | 345/156 |

* cited by examiner

Primary Examiner—Brian K. Talbot
(74) Attorney, Agent, or Firm—Birch, Stewart, Kolasch & Birch, LLP

(57) ABSTRACT

A method for manufacturing a touch screen linearization pattern which is necessary for a five wire resistive type or current sensing type touch screen, and directly affects the accuracy, production price, and border area size of the touch screen, includes the steps of printing a linearization pattern on the border area of a conductive glass surface with a selected ink. The ink is made by blending highly conductive silver powder between about 59% to 62% in weight and carbon powder between about 14% to 16% in a contact agent solvent between about 24% to 25% in weight. The touch screen thus formed has a resistance value ratio of about ten between the square surface of the glass layer and the two ends of the linearization pattern.

10 Claims, 4 Drawing Sheets

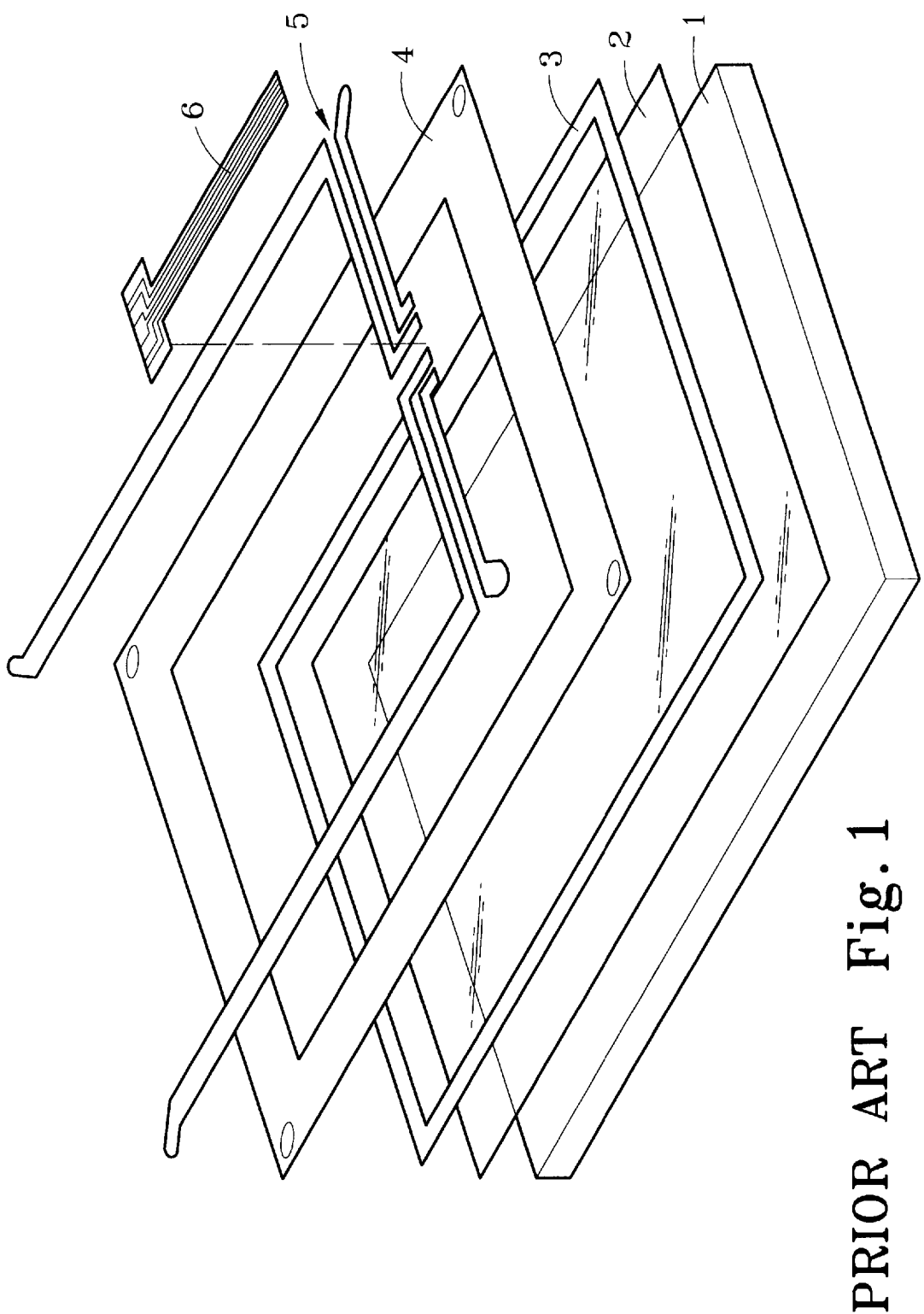
PRIOR ART Fig. 1

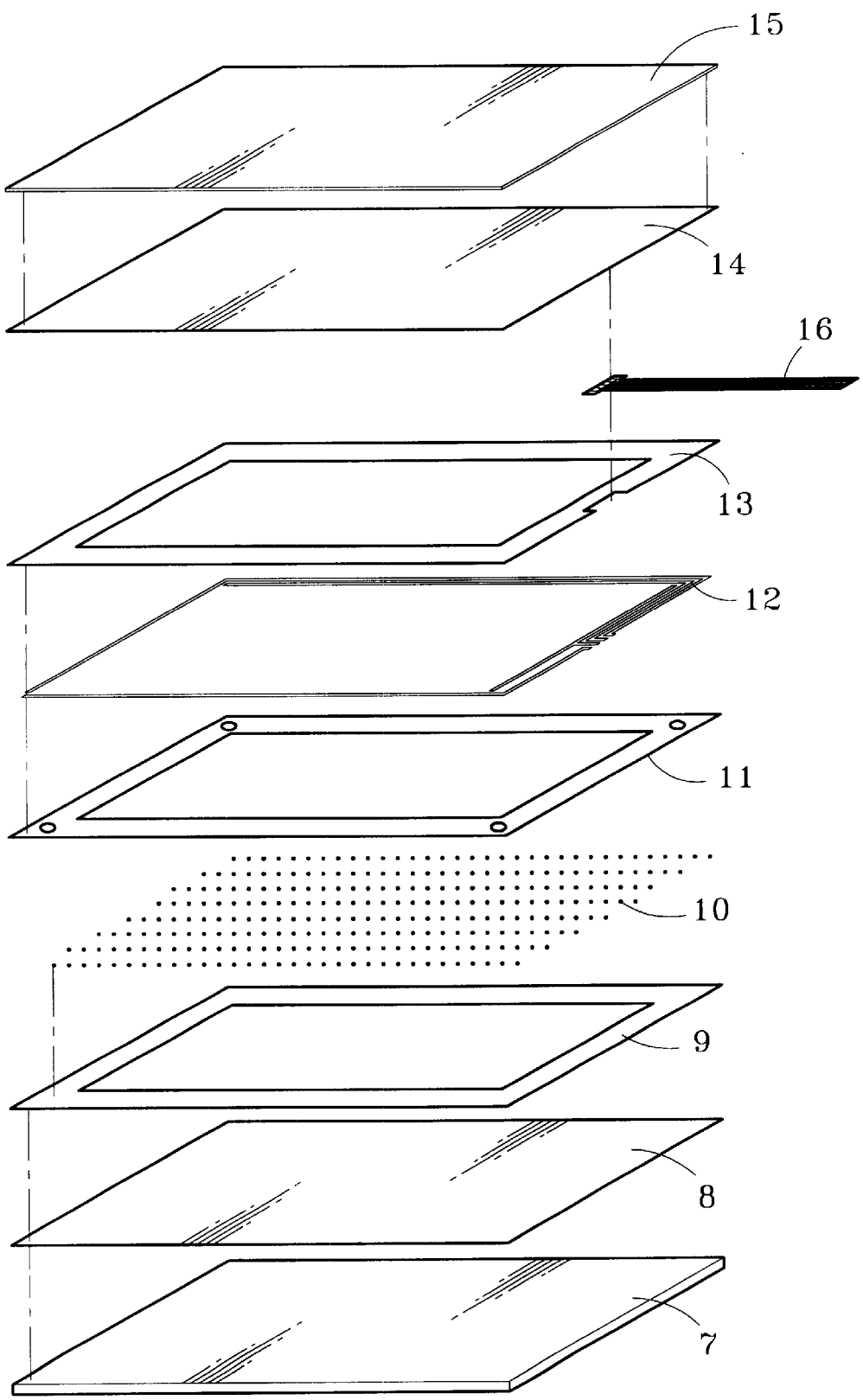
PRIOR ART Fig. 2

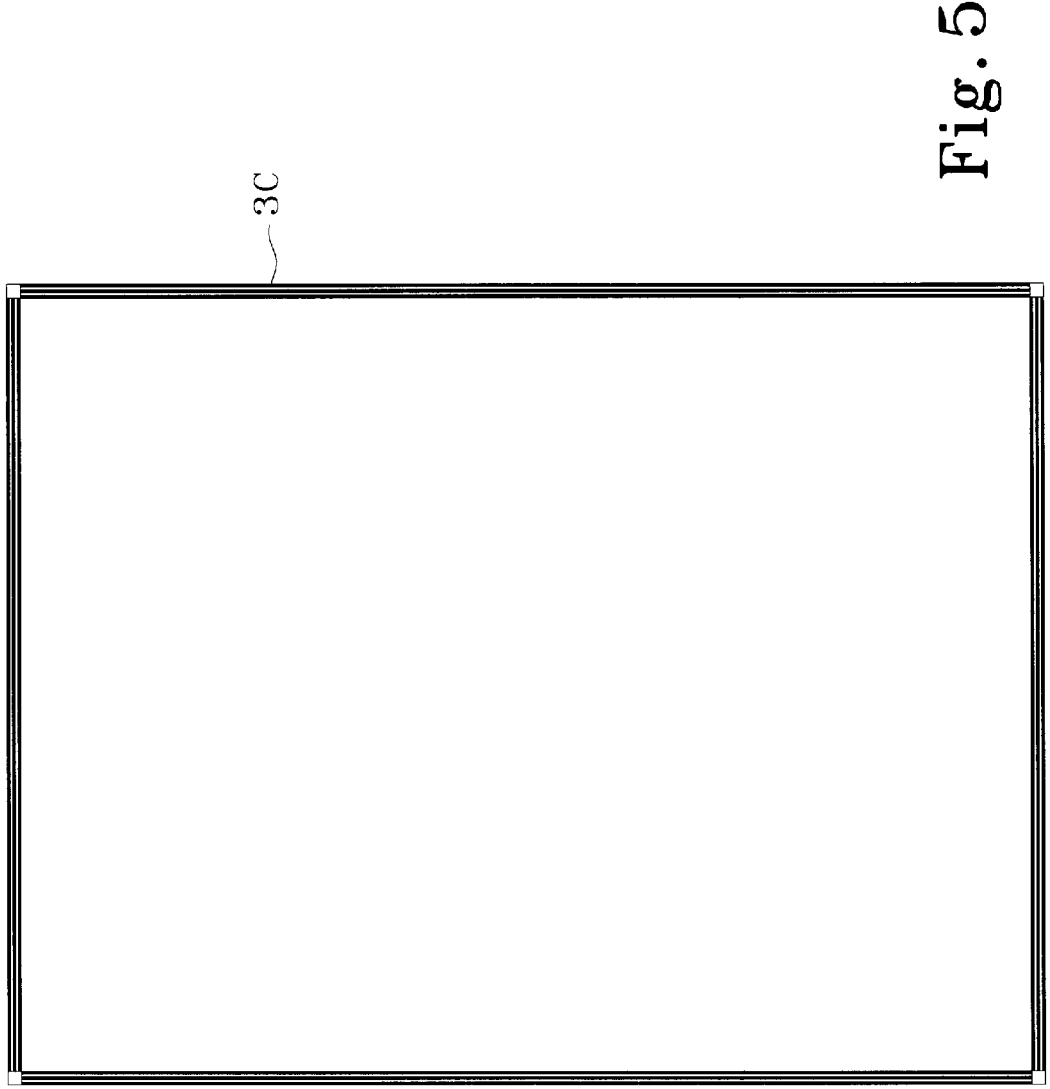

METHOD FOR MANUFACTURING TOUCH
SCREEN LINEARIZATION PATTERN

BACKGROUND OF THE INVENTION

This invention relates to a novel method for manufacturing a touch screen linearization pattern and particularly to a method of producing a linearization pattern that is capable of increasing a resistance ratio of a glass surface unit square against two ends of the linearization pattern.

Presently, voltage sensing type touch screens and current sensing type touch screens have been widely used in desk top computers, handheld computers or notebook computers. Users may write, draw pictures or select various functions or press command keys on the screen to generate electric signals and input into the computer to perform processes desired. When in use, the computer carries out switching of functional windows on the screen, and users do not have to operate the computer through the keyboard.

The touch screen set forth above (as shown in FIG. 1 for a traditional current sensing type touch screen) usually includes a glass layer 1, a conductive membrane layer 2, a linearization pattern 3, an isolation layer 4, a four wire silver printing layer 5 and a tail cable 6 connecting to a controller. The controller outputs four equal voltages to four linearization ends of the touch screen to measure current variation.

When different points of the touch screen are touched, the current at the four ends will have different changes. Through measuring the current variation, the controller can determine the touched position. Detailed operation principle may be found in U.S. Pat. No. 4,293,734.

In practice, the design of linearization pattern directly affects the accuracy, price and occupied space of the touch screen. Earlier linearization patterns consisted of discrete resistor elements linking to the border area of the touch screen to form a resistor network. This type of resistor network is not desirable either in manufacturing or final accuracy of the touch screen. Later, a technique of forming linearization patterns by printing was developed. Reference can be found in U.S. Pat. No. 3,798,370. However, same as before, the resulting linearization patterns occupy a relatively large border area of the touch screen and result in less useful area for the touch screen. In the present LCD development, border area becomes smaller constantly, and large size linearization pattern will have little or no market acceptance.

In the past, there was a concept for making the touch screen linearization pattern disclosed in U.S. Pat. No. 3,591,718. However it does not provide a practical method for manufacturing, and the concept never materializes commercially.

There is another type of touch screen (as shown in FIG. 2. a traditional voltage sensing type five wire touch screen) which includes a glass layer 7, an Indium Tin Oxide (ITO) conductive layer 8, a linearization pattern 9, a set of insulation points 10, an isolation layer 11, a four wire silver printing layer 12, another isolation layer 13, another ITO conductive layer 14, a plastic membrane layer 15 and a tail cable 16 linking to a controller. In operating principle, the lower ITO links to an even electric field of 0–5V in X-axis direction. When the touch screen is touched, the upper ITO layer contacts the lower ITO layer and measures the voltage value. The voltage ratio represents the positional ratio on the touch screen in that direction (X-axis). For instance, 3V represents the touch point located at 60% of the total length in the X-direction. When measuring of one direction (i.e. X-axis) is finished, the controller panel converts the lower ITO to an even electric field of 0–5V in Y-axis direction, then uses the lower ITO layer to measure the voltage value of touch point at the upper layer and measure the position in another direction (Y-axis). Reference details can be found in U.S. Pat. No. 3,798,370. This type of touch screen also needs linearization pattern to increase accuracy. In this type of touch screen, ELO's five wire resistive touch screen is the most popular on the market. ELO's linearization pattern is made by forming the resistor network from separated silver paste, and adding and removing some of the conductive sputtering layer to increase the accuracy of the linearization pattern used on the touch screen. However, ELO's touch screen still has a lot of linearization deficiency at the border corners. The process of removing the conductive layer also increases the production cost of the touch screen.

SUMMARY OF THE INVENTION

It is therefore an object of this invention to overcome the foregoing disadvantages by blending high conductive material such as silver powder and carbon powder and contact agent solvent to form a printing ink, then using the ink to print an even resistor line at the border area of the touch screen to form a connected resistor network to serve as linearization pattern thereby to increase accuracy of the touch screen and reduce production cost and reduce the border area being used.

Another object of this invention is to use other high conductive high conductive metallic material such as copper powder. By changing relative material contents, a desirable resistance coefficient may be obtained thereby to produce a linearization pattern desired. During manufacture of the material composition arrangement, the size and thickness of the pattern may be used to compensate the conductivity overshoot or deficient of the material to ensure that the final resistance ratio of each square of glass surface against two ends of the linearization pattern reaches about ten.

In one aspect, this invention provides a blended material for printing the required resistance value to couple with existing ITO conductive glass now available on the market to produce a low cost touch screen that has high accuracy and more useable area.

BRIEF DESCRIPTION OF THE DRAWINGS

The invention, as well as its many advantages, may be further understood by the following detailed description and drawings.

FIG. 1 is a schematic exploded view of a conventional current sensing type touch screen.

FIG. 2 is a schematic exploded view of a conventional five wire voltage sensing type touch screen.

FIG. 5 is a schematic view of a third linearization pattern according to this invention.

DESCRIPTION OF THE PREFERRED EMBODIMENTS

Figure 3:
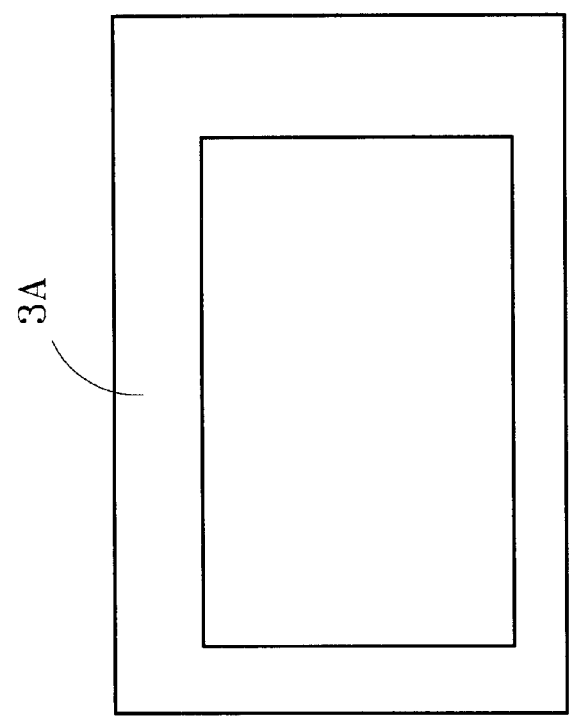
FIG. 3 is a schematic view of a first improved linearization pattern based on the linearization pattern layer shown in FIG. 1 or 2.

Referring to FIG. 3 for a first linearization pattern structure made by the method of this invention based on the linearization pattern layer shown in FIGS. 1 and 2, which seeks to improve the linearization patterns at the linearization layer 3 and 9 for increasing the accuracy of the linearization of the touch screen.

As the resistance ratio between the coated surface of the glass layer 1 or 7 (shown in FIGS. 1 and 2) and the two ends of the linearization pattern 3A, and the evenness of the linearization pattern 3A. determine the accuracy of the touch screen, the linearization pattern 3A used in this invention is formed by a printing method which prints high conductive material on a glass layer 1 or 7 sputter coated with low conductive material or other material. Hence the linearization pattern 3A is very even. The only factor which determines the linearization accuracy of the touch screen is the ratio of the resistance over the coated surface of the glass layer 1 and 7 (shown in FIGS. 1 and 2) against that of the two ends of the linearization pattern 3A. A higher ratio value means higher accuracy. However when the value is too high, it becomes difficult for the controller to measure. Hence in practice the value is controlled at about ten. The resistance of over the square surface of the glass layer 1 or 7 may be selected from what is available on the market, for instance, but not limited to, ITO glass from MERCK with a resistance of 500Ω per square or ITO glass from AVCT with a resistance of 1500Ω per square. The resistance value at the two ends of the linearization pattern may be calculated by the following equation:

$$R=(p\,L)/(WH)$$

Where p is a resistance coefficient determined by material, and may be changed by the ratio of acceptable silver and carbon powder. L is length, W is width, and H is height, Hence the resistance value of the two ends of the linearization pattern 3A may be changed through controlling of print dimensions. When using the aforesaid equation to derive the resistance value and comparing it with the ITO resistance value being used, the resistance ratio between the glass 1 or 7 and linearization pattern 3A may be obtained.)

The first linearization pattern structure set forth is formed by printing of a selected ink on the surface of the conductive glass ITO (the glass layer 1 and 7 shown in FIGS. 1 and 2). The ink is made by blending high conductive silver powder 62% and carbon powder 14% in a contact agent solvent (or adhesive) 24% in weight. When the linearization pattern 3A is being printed, it has a thickness of 10 micro meter which has resistance of 0.5 ohm per mm². The linearization pattern 3A has a width of 3 mm and a length of 300 mm at each side so that L/WH=100 mm and the resistance R=50 ohm/side of a square. The two ends together have resistance of 100 ohm, and the ITO glass has a resistance of 500 ohm for each square in the touchpad. The linearization accuracy of the touch screen is higher than 99% when formed resistance ratio of 10 to 1 between the ITO resistance and linearization patterns at two sides.

Figure 4:
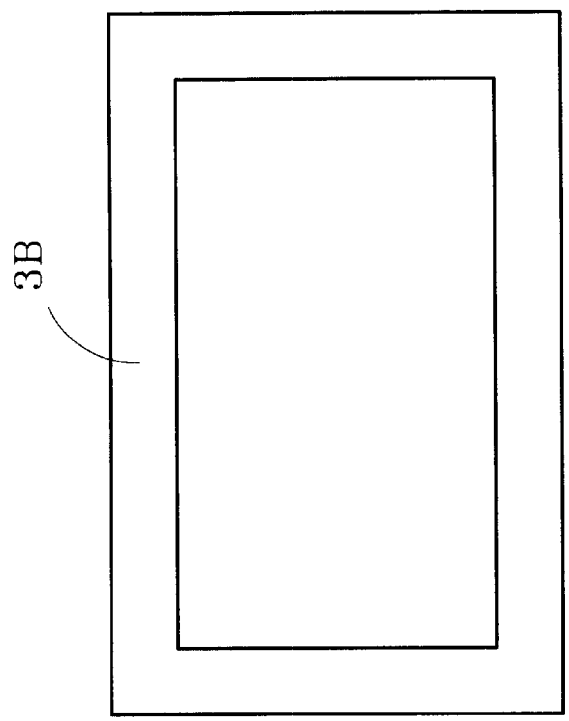
FIG. 4 is a schematic view of a second improved linearization pattern based on the linearization pattern layer shown in FIG. 1 or 2.

FIG. 4 illustrates a second linearization pattern structure made by the method of this invention based on the linear pattern layer shown FIGS. 1 and 2. The linearization pattern 3B is printed by an ink made by blending high conductive material of silver powder 59% and carbon powder 16% in a contact agent (or adhesive) solvent 25% in weight. When the linearization pattern 3B is being printed on the surface of the conductive glass ITO (as the glass layer 1 and 7 shown in FIGS. 1 and 2), it has a thickness of 10 micro meter which has resistance of 1 ohm per mm². The linearization pattern 3B has a width of 3 mm and a length of 300 mm at each side so that L/WH equals 100. Again, the two ends together have resistance of 100 ohm, and the ITO glass has a resistance of 1000 ohm for a square. The linearization accuracy of the touch screen is higher than 99% when formed by a resistance ratio of 10 to 1 between the ITO resistance and linearization patterns at two sides.

It is to be noted that the embodiment examples set forth above are not contemplated to limit silver and carbon powder as the only choice of high conductive material. Other metallic material may be used as substitute, such as copper powder. A desired resistance coefficient may be obtained by changing the relative contents and to form desirable liner patterns. In the process of blending the material, it is also possible to change pattern size and height to compensate the conductivity overshoot or deficient of the material to ensure that the final resistance value ratio between the square surface of the glass and the linearization pattern reaches about ten.

Furthermore, besides forming the linearization pattern 3A and 3B at the border area set forth above, the linearization pattern may also be printed in lines form 3C (as shown in FIG. 5).

What is claimed is:

1. A method for manufacturing a linearization pattern for a touch screen including a glass layer having a surface on which a conductive layer having a low conductivity has been sputter coated, a linearization pattern, an isolation layer, a four wire silver printing layer and a tail cable connected to a controller, the controller being arranged to output four equal voltages to four ends of the touch screen and to measure current variation, comprising the steps of:

making an ink by blending highly conductive material of silver powder in a percentage weight range of between about 59% to 62% and carbon powder in a percentage weight range of between about 14% to 16% in a contact agent solvent having a percentage weight range of between about 24% to 25%; and using the ink to print a linearization pattern on a border of the sputter-coated glass layer surface to form a linearization pattern such that a resistance value ratio between a square of the sputter-coated glass layer and two ends of the linearization pattern is about 10.

2. The method of claim 1, wherein the sputter-coated glass layer is made of Indium Tin Oxide glass which has a resistance of value of 500Ω per square or 1500Ω per square.

3. The method of claim 1, wherein the resistance coefficient of the linearization pattern is determined by the material of the pattern and is changeable through variation of the contained acceptable silver powder and carbon powder, and is changeable by the size and shape of the linearization pattern in order to achieve said resistance value ratio of about 10.

4. The method of claim 1, wherein the linearization pattern has a height of 10 micro meter which has a resistance of 0.5 ohm per square, and has a width of 3 mm and a length of 300 mm for a total resistance of 100Ω at two sides thereof and 50Ω at each side, and wherein the sputter-coated glass layer is Indium Tin Oxide glass which hits a 500Ω per square resistance thereby providing a resistance ratio of 10:1 between the Indium Tin Oxide resistance value and the resistance value of the linearization patterns.

5. The method of claim 6, wherein the linearization pattern has a height of 10 micro meter which has a resistance of 1 ohm per squares and has a width of 3 mm and a length of 300 mm for a resistance of 100Ω at each side, and wherein the sputter-coated glass layer is Indium Tin Oxide glass which has a 1000Ω per square resistance, thereby providing a resistance ratio of 10:1 between the Indium Tin Oxide resistance value and the resistance value of the linearization patterns.

6. A method for manufacturing a linearization pattern for a touch screen including a glass layer having a surface on which a lower ITO conductive layer has been sputter coated, a linearization pattern, a set of insulation points, an isolation layer, a four wire silver printing layer, another isolation layer, an upper ITO conductive layer, a plastic layer and a tail cable connected to a controller, the upper ITO layer being contactable to the lower ITO layer for measuring the voltage of the contact point, comprising the steps of:

making an ink by blending highly conductive material of silver powder in a percentage weight range of between about 59% to 62%, and carbon powder in a percentage weight range of between about 14% to 16% in a contact agent solvent having a percentage weight range of between about 24% to 25%; and using the ink to print a linearization pattern on a border of the sputter-coated glass layer surface to form a linearization pattern such that a resistance value ratio between a square of the sputter-coated glass layer and two ends of the linearization pattern is about 10.

7. The method of claim 6, wherein the sputter-coated glass layer is made of Indium Tin Oxide glass which has a resistance of value of 500Ω per square or 1500Ω per square.

8. The method of claim 6, wherein the resistance coefficient of the linearization pattern is determined by the material of the pattern and is changeable through variation of the contained acceptable silver powder and carbon powder, and is changeable by the size and shape of the linearization pattern in order to achieve said resistance value ratio of about 10.

9. The method of claim 6, wherein the linearization pattern has a height of 10 micro meter which has a resistance of 0.5 ohm per square, and has a width of 3 mm and a length of 300 mm for a total resistance of 100Ω at two sides thereof and 50Ω at each side, and wherein the sputter-coated glass layer is Indium tin Oxide glass which has a 500Ω per square resistance, thereby providing a resistance ratio of 10:1 between the Indium Tin Oxide resistance value and the resistance value of the linearization patterns.

10. The method of claim 6, wherein the linearization pattern has a height of 10 micro meter which has a resistance of 1 ohm per square, and has a width of 3 mm and a length of 300 mm for a resistance of 100Ω at each side, and wherein the sputter-coated glass layer is Indium tin Oxide glass which has a 1000Ω per square resistance, thereby providing a resistance ratio of 10:1 between the Indium Tin Oxide resistance value and the resistance value of the linearization patterns.

* * * * *